(12) United States Patent
Anumala et al.

(10) Patent No.: US 9,036,470 B2
(45) Date of Patent: May 19, 2015

(54) SYSTEM AND METHOD FOR VIRTUAL PRIVATE APPLICATION NETWORKS (71) Applicant: DELL PRODUCTS L.P., Round Rock, CA (US)

(72) Inventors: Mohnish Anumala, Cupertino, CA (US); Jeyasubramanian Irungolapillai, Chennai (IN); Aseem Kumar Srivastava, Milpitas, CA (US)

(73) Assignee: Dell Products L.P., Round Rock, TX (US)

( * ) Notice: Subject to any disclaimer, the term of this patent is extended or adjusted under 35 U.S.C. 154(b) by 107 days.

(21) Appl. No.: 13/794,658

(22) Filed: Mar. 11, 2013

(65) Prior Publication Data
US 2014/0254406 A1    Sep. 11, 2014

(51) Int. Cl.
*H04L 1/00* (2006.01)
*H04L 12/801* (2013.01)

(52) U.S. Cl.
CPC .................................... *H04L 47/10* (2013.01)

(58) Field of Classification Search
USPC .............. 370/252, 229, 230, 231, 230.1, 235; 726/15
See application file for complete search history.

(56) References Cited

U.S. PATENT DOCUMENTS

2013/0318345 A1*  11/2013  Hengeveld ..................... 713/168

* cited by examiner

*Primary Examiner* — Dady Chery
(74) *Attorney, Agent, or Firm* — Haynes and Boone, LLP (57) ABSTRACT

A system and method for virtual private application networks includes receiving a first packet associated with a first network flow at a network device, determining one or more first characteristics of the first network flow based on information associated with the first packet, determining one or more second characteristics of a first virtual private application network (VPAN) based on information associated with the one or more first characteristics, assigning the first network flow to the first VPAN, selecting one or more first network switching devices to be associated with the first VPAN, and transmitting one or more first flow control messages to the selected one or more first network switching devices. The one or more first flow control messages provide forwarding instructions for network traffic associated with the first network flow to the selected one or more first network switching devices.

16 Claims, 5 Drawing Sheets

SYSTEM AND METHOD FOR VIRTUAL PRIVATE APPLICATION NETWORKS

BACKGROUND

The present disclosure relates generally to information handling systems, and more particularly to virtual private application networks.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling all types of communication and information. Making all of this possible is a vast array of network switching products that make forwarding decisions in order to deliver packets of information from a source system or first network node to a destination system or second network node. Due to the size, complexity, and dynamic nature of these networks, sophisticated network switching products are often required to continuously make forwarding decisions and to update forwarding information as network configurations change. The forwarding decisions may be further complicated by use of these networks by different applications, each having different types and amounts of data that needs to be transferred as network traffic.

Accordingly, it would be desirable to provide improved network switching products that can select paths for forwarding and/or routing network traffic through a network. It would further be desirable to provide improved network switching products that can select paths based on the type and amount of data that needs to be transferred through a network.

SUMMARY

According to one embodiment, a method of managing networks includes receiving a first packet associated with a first network flow at a network device, determining one or more first characteristics of the first network flow based on information associated with the first packet, determining one or more second characteristics of a first virtual private application network (VPAN) based on information associated with the one or more first characteristics, assigning the first network flow to the first VPAN, selecting one or more first network switching devices to be associated with the first VPAN, and transmitting one or more first flow control messages to the selected one or more first network switching devices. The one or more first flow control messages provide forwarding instructions for network traffic associated with the first network flow to the selected one or more first network switching devices.

According to another embodiment, a managing server includes a controller and one or more ports coupled to the controller and configured to couple the managing server to one or more first network switching devices. The managing server is configured to receive a packet associated with a network flow at a first port selected from the one or more ports, determine one or more first characteristics of the network flow based on information associated with the packet, determine one or more second characteristics of a virtual private application network (VPAN) based on information associated with the one or more first characteristics, store information associated with the VPAN, assign the network flow to the VPAN, select one or more second network switching devices from the one or more first network switching devices to be associated with the VPAN, and transmit one or more first flow control messages to the selected one or more second network switching devices. The one or more first flow control messages provide forwarding instructions for network traffic associated with the network flow to the selected one or more second network switching devices and define a first path using the selected one or more second network switching devices.

According to yet another embodiment, an information handling system includes a managing server. The managing server includes a controller and one or more ports coupled to the controller and configured to couple the managing server to one or more first network switching units. The managing server is configured to receive a packet associated with a network flow at a first port selected from the one or more ports, determine one or more first characteristics of the network flow based on information associated with the packet, determine one or more second characteristics of a virtual private application network (VPAN) based on information associated with the one or more first characteristics, store information associated with the VPAN, assign the network flow to the VPAN, select one or more second network switching devices from the one or more first network switching devices to be associated with the VPAN, and transmit one or more first flow control messages to the selected one or more second network switching devices. The one or more first flow control messages provide forwarding instructions for network traffic associated with the network flow to the selected one or more second network switching devices and define a first path using the selected one or more second network switching devices.

BRIEF DESCRIPTION OF THE DRAWINGS

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
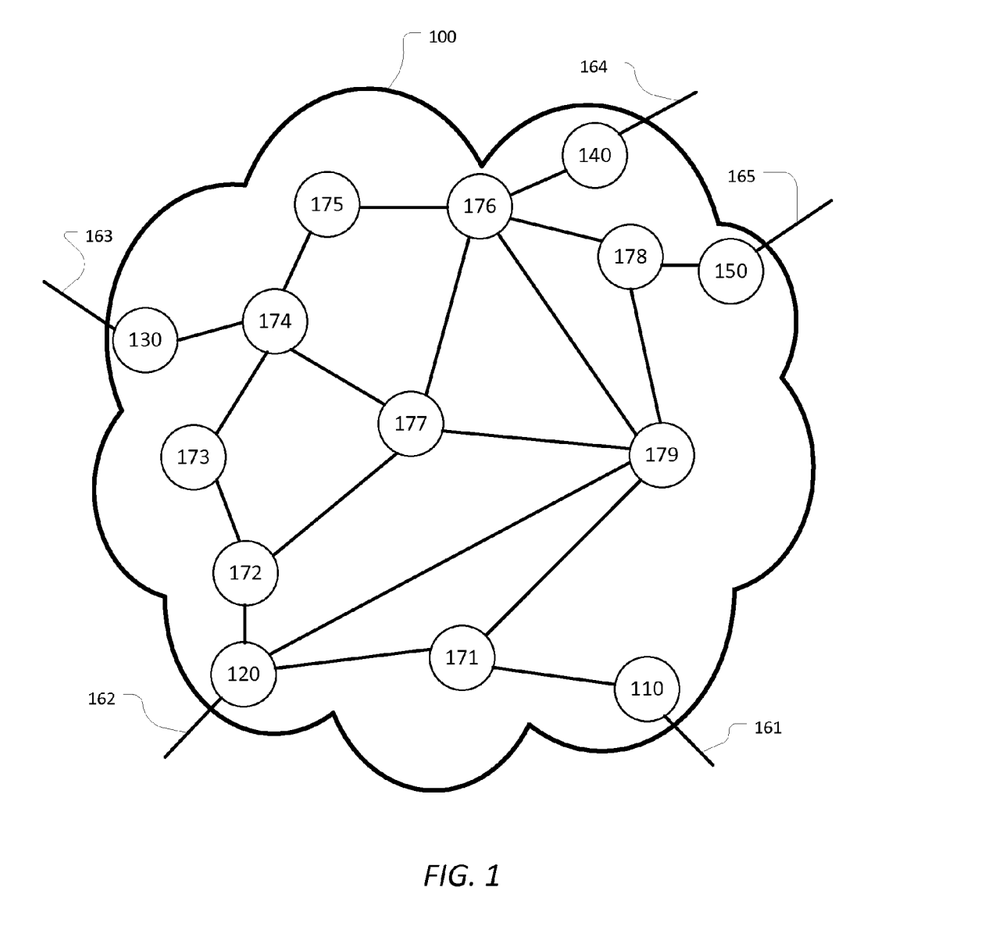
FIG. 1 is a simplified diagram of an autonomous system according to some embodiments.

FIG. 1 is a simplified diagram of an autonomous system 100 according to some embodiments. In some examples, the autonomous system 100 may be used for local and/or semi-local management of network switching devices. As shown in FIG. 1, the autonomous system 100 includes both edge network switching devices and non-edge network switching devices. The edge network switching devices include the network switching devices 110, 120, 130, 140, and 150. The network switching devices 110, 120, 130, 140, and 150 are edge network switching devices because they are coupled to other autonomous systems using network links 161, 162, 163, 164, and 165, respectively. The non-edge network switching devices include network switching devices 171-179. The network switching devices 171-179 are non-edge network switching devices because they are not directly coupled to any of the other autonomous systems.

Each of the network switching devices, both edge and non-edge, are coupled within the autonomous system 100 using various network links. For example, the network switching device 110 is coupled to the network switching device 171 and the network switching device 176 is coupled to the network switching devices 140, 175, 178, and 179 using corresponding network links.

Each of the network switching devices within the autonomous system 100 make decisions with respect to a path on which to forward network traffic. In many cases, multiple paths exist. For example, the autonomous system 100 includes many different paths, without loops, for forwarding network traffic between network switching device 176 and network switching device 177. Some examples include: 1) directly between network switching device 176 and network switching device 177, 2) a path using network switching devices 175 and 174, 3) a path using network switching devices 175, 174, 173, and 172, 4) a path using network switching device 179, 5) a path using network switching devices 178 and 179, 6) a path using network switching devices 178, 179, 171, 120, 172, 173, and 174, as well as several others. Paths may be similarly determined between any two network switching devices within the autonomous system.

Figure 2:
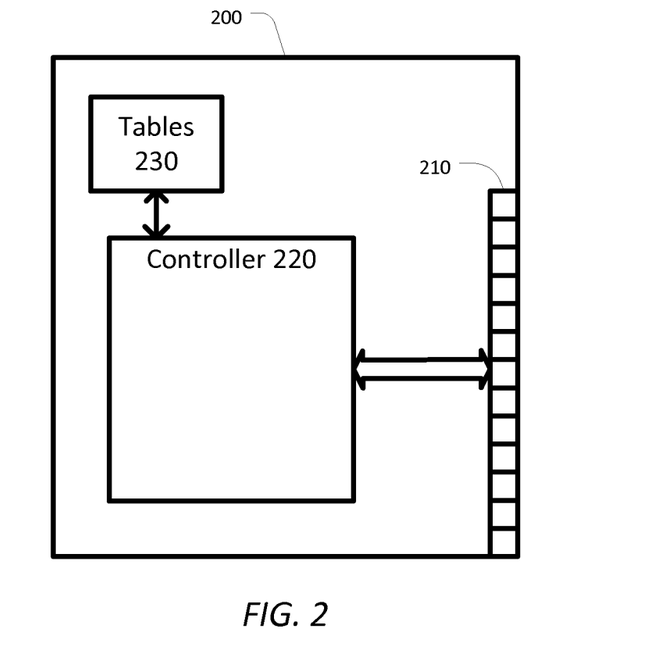
FIG. 2 is a simplified diagram of a network switching device according to some embodiments.

FIG. 2 is a simplified diagram of a network switching device 200 according to some embodiments. As shown in FIG. 2, the network switching device 200 includes one or more ports 210 for coupling the network switching device 200 to one or more corresponding network links that couple the network switching device 200 to other network switching devices. The network switching device 200 includes a controller 220 and one or more forwarding information tables 230. In some examples, the controller 220 may manage and/or control the operation of the network switching device 200. In some examples, the controller 220 may maintain and/or update the one or more forwarding information tables 230. In some examples, the one or more forwarding information tables 230 may include one or more tables selected from a group comprising virtual LAN (VLAN) tables, media access control (MAC) tables, layer 3 (L3) tables, layer 3 forwarding information bases, access control lists (ACLs), flow processing (FP) tables, and the like. In some examples, the one or more forwarding information tables 230 may be stored in memory coupled with the network switching device 200 and/or the controller 220. In some examples, the one or more forwarding information tables 230 may be implemented using data structures other than tables and/or using databases. According to some embodiments, the network switching device 200 may be any of the network switching devices 110-150 and/or 171-179.

Referring back to FIG. 1, many different types of network traffic may move within or across the autonomous system 100 during its operation. Network traffic with different needs, characteristics, and/or features may be forwarded by the network switching devices in the autonomous system 100. In some examples, when each of the network switching devices needs to forward network traffic within or across the autonomous system 100, the characteristics of the network traffic, the intervening network switching devices, and/or the intervening network links may be considered. In some examples, a number of intervening network links or next hops may be used to make forwarding decisions. In some examples, a throughput and/or a latency of the intervening network switching devices and/or network links may be considered. In some examples, a desired quality of service (QoS) may be considered. In some examples, congestion in the intervening network switching devices and/or network links may be considered. In some examples, multiple criteria may be considered in making the forwarding decision. In general, though, the forwarding decision is made in a distributed and local fashion where each network switching device along the path makes a forwarding decision based on forwarding information available at that network switching device.

Users and/or applications using the autonomous system 100 for forwarding network traffic have many different protocols available for providing limited management over forwarding behavior in the autonomous system 100. In some examples, protocols such as virtual private networks (VPNs) and Internet Protocol Security (IPSec) may be used to encrypt network traffic that is forwarded in the autonomous system 100. In some examples, virtual routing and forwarding (VRF) may be used to create multiple versions of forwarding information tables (e.g., the one or more forwarding information tables 230) so that network traffic using different address sets may be forwarded using different strategies. In some examples, QoS and the Resource Reservation Protocol (RSVP) may be used to emphasize different network traffic characteristics that may affect the forwarding decisions made by the network switching devices.

According to some embodiments, each of these protocols may provide a limited ability to provide different handling for different subsets of network traffic based on the different needs, characteristics, and/or features of each of the different subsets. In some examples, the different handling may be accomplished through special designations in packets of the network traffic. In some examples, additional protocol headers and/or encapsulation may be used to implement the special designations. In some examples, a source network device and a destination network device may coordinate to determine the special designations. In some examples, the network traffic may still be forwarded within or through the autonomous system 100 subject to the distributed and local forwarding decisions made by each of the network switching devices that received and then forward the packets of the network traffic. These distributed and local forwarding decisions may often provide a practical way for a network with large numbers of network switching devices to handle large quantities of very different network traffic. However, localized management and control of network traffic may not always result in best overall forwarding decisions for the network as a whole. In some examples, with localized management, failures, changes, and/or congestion in one part of the network may not always be considered in another part of the network and may results in very inefficient use of the network and/or losses of large quantities of network traffic.

According to some embodiments, more centralized management of the network traffic throughout the autonomous system 100 may be obtained by using software defined networking (SDN). In SDN, management and control of forwarding within the autonomous system 100 may be at least partially separated from the network switching devices that do the actual forwarding. In some examples, this may be used to provide more centralized management and control of the forwarding. In some examples, the centralized management and control may be obtained by selecting one or more of the network switching devices within the autonomous system as a controller for the autonomous system.

Figure 3:
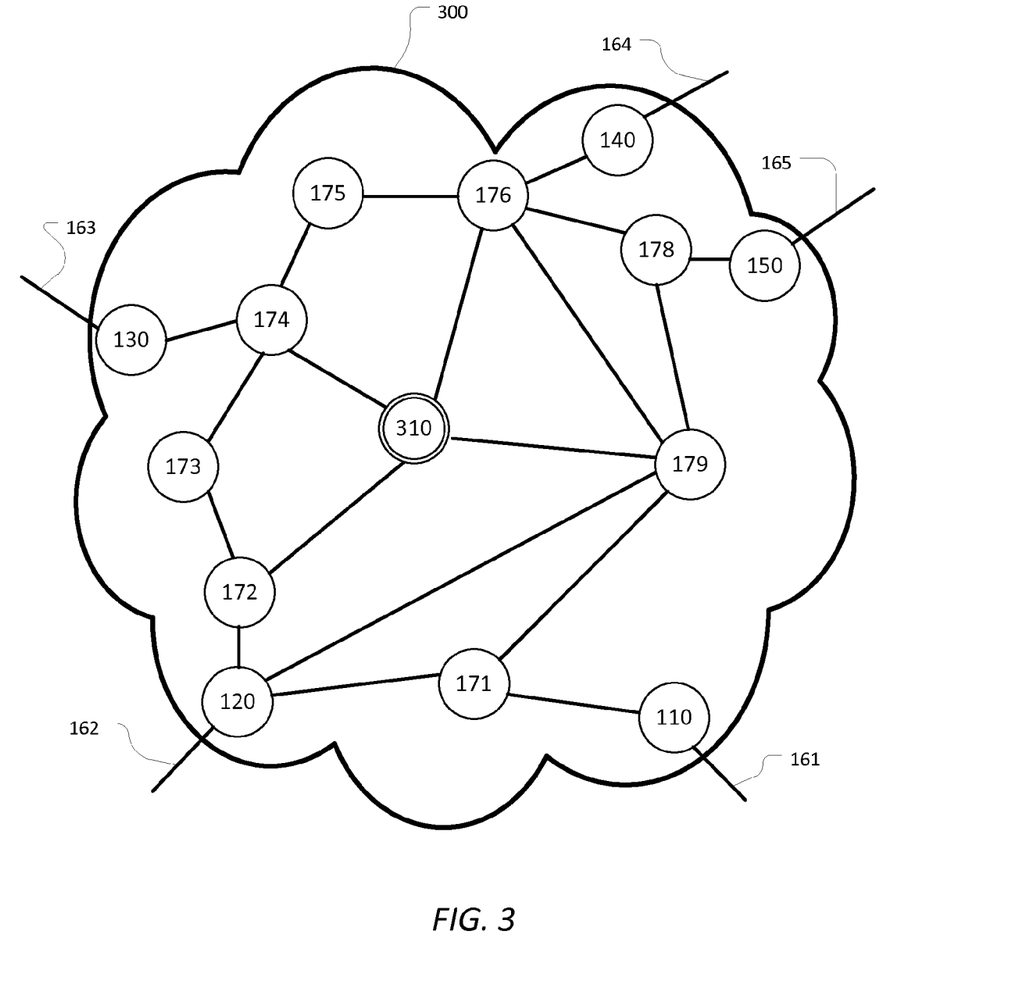
FIG. 3 is a simplified diagram of an autonomous system including a managing server according to some embodiments.

FIG. 3 is a simplified diagram of an autonomous system 300 including a managing server according to some embodiments. As shown in FIG. 3, the autonomous system 300 is generally the same as the autonomous system 100 from FIG. 1. One difference between the autonomous system 300 and the autonomous system 100 is the inclusion of a managing server 310. In some examples, the managing server 310 may replace the network switching device 177. In some examples, the managing server 310 may be the network switching device 177 enhanced to include additional functionality to provide the centralized management and control.

Figure 4:
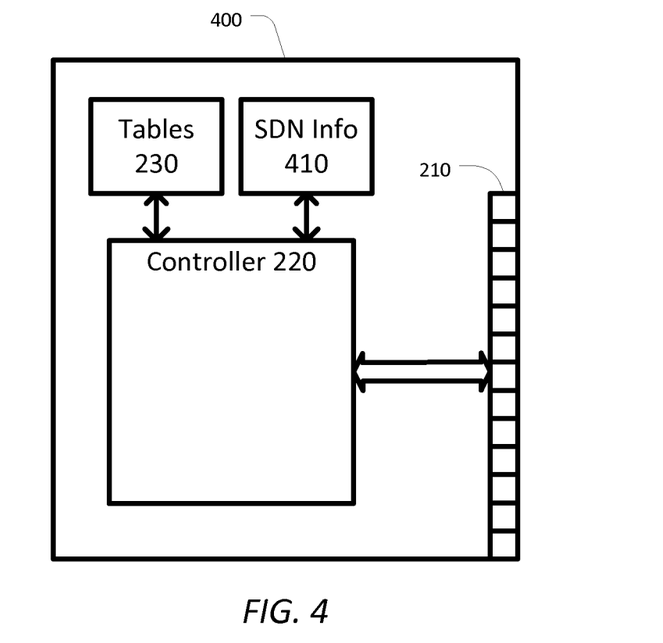
FIG. 4 is a simplified diagram of a SDN managing server according to some embodiments.

FIG. 4 is a simplified diagram of a SDN managing server 400 according to some embodiments. As shown in FIG. 4, the SDN managing server 400 may be very similar to the network switching device 200, but the SDN managing server 400 further includes SDN information 410. In some examples, the SDN managing server 400 may be the managing server 310. In some examples, the SDN information 410 may include one or more data structures for recording information related to an autonomous system such as the autonomous system 300. In some examples, the SDN information 410 may be stored in memory coupled with the SDN managing server 400 and/or the controller 220. Using the SDN information 410, the SDN managing server 400 may provide management and control over network traffic throughout the autonomous system. In some examples, the autonomous system may have a single SDN managing server 400 as shown in FIG. 3, but more than one SDN managing server 400 may be used.

According to some embodiments, the SDN managing server 400 may provide flow control messages and/or flow processing messages to the other network switching devices within the autonomous system. In some examples, the flow control messages may include processing and/or forwarding instructions for network traffic packets that meet certain criteria. In some examples, the flow control messages may provide next hop instructions for packets containing certain combinations of source and destination IP addresses. In some examples, the flow control messages may provide next hop instructions for packets directed to specific transmission control protocol (TCP)/user datagram protocol (UDP) ports. In some examples, the flow control messages may be very flexible and include forwarding instructions based on complex packet matching and/or filtering considerations. In some examples, when each of the network switching devices of the autonomous system receive flow control messages, the flow control messages may be used to modify one or more forwarding information tables such as the one or more forwarding information tables 230. In some examples, the flow control messages may be used to modify the ACL tables and/or the FP tables. Once the one or more forwarding information tables are updated, the network switching devices may use them to identify incoming packets meeting the certain criteria and then forward the packets according to the corresponding forwarding instructions. In some examples, the flow control messages may be compatible with OpenFlow.

In general, SDN provides only a framework for centralized management and control of the autonomous system. In some examples, SDN may only be used to provide a static configuration for the autonomous system as specified during provisioning of the autonomous system. In some examples, SDN may be used manually by a researcher to configure the autonomous system for a particular experiment.

Figure 5:
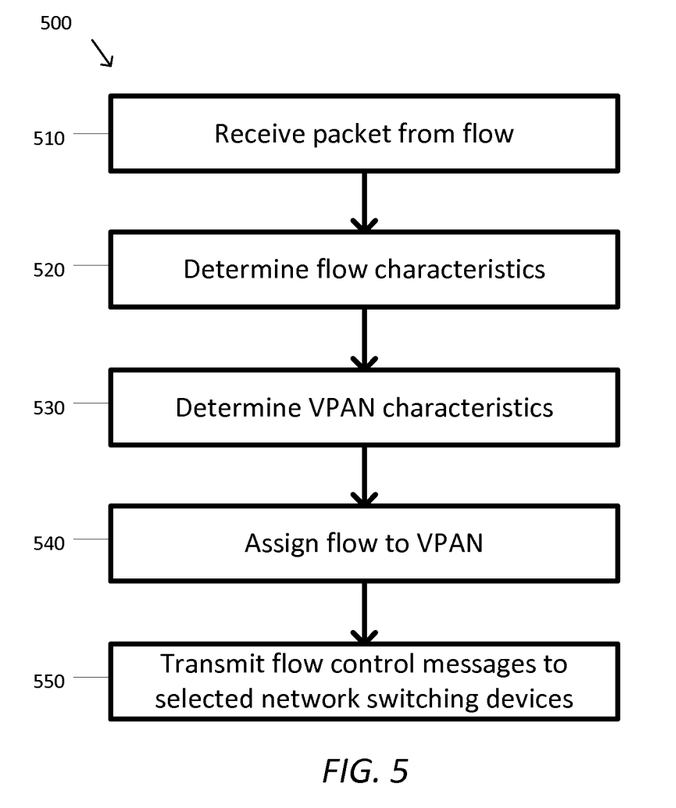
FIG. 5 is a simplified diagram showing a method of forming a virtual private application network according to some embodiments.

FIG. 5 is a simplified diagram showing a method 500 of forming a virtual private application network (VPAN) according to some embodiments. As shown in FIG. 5, the method 500 includes a process 510 for receiving a packet from a flow, a process 520 for determining flow characteristics, a process 530 for determining characteristics of a VPAN, a process 540, for assigning the flow to the VPAN, and a process 550 for transmitting flow control messages to selected network switching devices. According to certain embodiments, the method 500 of forming a virtual private application network can be performed using variations among the processes 510-550 as would be recognized by one of ordinary skill in the art. In some embodiments, one or more of the processes 510-550 of method 500 may be implemented, at least in part, in the form of executable code stored on non-transient, tangible, machine readable media that when run by one or more processors (e.g., one or more processors in the managing server 310 and/or the SDN managing server 400) may cause the one or more processors to perform one or more of the processes 510-550.

At the process 510, a packet from a flow is received. In some examples, the packet may be received by a managing server. In some examples, the managing server may be the managing server 310 and/or the SDN managing server 400. In some examples, the packet may be received from another network switching device. In some examples, the another network switching device may be part of a same autonomous system as the managing server. In some examples, the flow may be a series of packets containing related network traffic. In some examples, the network traffic in the flow may be related based on one or more features including, but not limited to, source addresses, destination addresses, TCP/UDP port ranges, applications, QoS designations, and the like. In some examples, the packet may be representative of the network traffic associated with the flow. In some examples, the packet may be a first packet from the flow that has been transmitted within the autonomous system. In some examples, the packet may be a copy of the first packet and/or the representative packet from the flow.

At the process 520, characteristics of the flow are determined. Based on information associated with the packet the managing server can determine characteristics of the flow. In some examples, the information associated with the packet may include source addresses, destination addresses, TCP/UDP port ranges, applications, QoS designations, and the like. In some examples, provisioning information received by the managing server may identify the information associated with the packet that should be considered in determining the characteristics of the flow. In some examples, the characteristics of the flow may be determined using deep packet inspection. During forwarding of most network traffic, network switching devices consider only packet headers associated with layer 2 (e.g., MAC) and/or layer 3 (e.g., IP) headers when making forwarding decisions. In most cases, the network switching devices ignore encapsulated payloads of the layer 2 and/or layer 3 packets that include headers and data associated with layers 4-7 (e.g., at the transport, session, presentation, and application layers) when making forwarding decisions. In some examples, the headers and/or data in layers 4-7 may be important in determining the characteristics of the flow as it is often these layers that may include valuable hints as to the characteristics of the flow. During deep packet inspection, headers and/or data in one or more of the layers 4-7 may be inspected to determine the characteristics of the flow.

At the process 530, characteristics of a VPAN are determined. Once the characteristics of the flow are known, characteristics of the VPAN are determined. In some examples, the characteristics of the VPAN may include identifying one or more network switching devices (i.e., a path) within the autonomous system most suitable for forwarding the flow. In some examples, determining the characteristics of the VPAN may include considering network congestion, bandwidth, latency, and/or other features of the network switching devices and network links in the autonomous system. In some examples, determining the characteristics of the VPAN may include considering characteristics of other VPANs. In some examples, the characteristics of the VPAN may include selecting a primary and an alternate path for the packets in the flow. In some examples, corresponding SDN information, such as the SDN information 410 may be created to record the characteristics of the VPAN.

At the process 540, the flow is assigned to the VPAN. Once the characteristics of the flow and the VPAN are determined, the flow is assigned to the VPAN. In some examples, assigning the flow to the VPAN may include determining additional characteristics of the packets in the flow that may be used to distinguish packets from the flow from packets in other flows that may or may not be associated with other VPANs.

At the process 550, flow control messages are transmitted to selected network switching devices. Once the managing server has determined the characteristics of the VPAN, the managing server may provision the network switching devices in the autonomous system so that the other network switching devices in the autonomous system can forward the packets in the flow consistent with the characteristics of the VPAN. In some examples, the managing server may transmit flow control messages to network switching devices selected to be part of a forwarding path for the flow through the autonomous system. In some examples, the flow control messages may include packet matching and/or filtering instructions as well as next hop instructions. The packet matching, packet filtering, and/or next hop instructions may be used by each of the selected network switching devices to recognize packets from the flow and forward them based on the VPAN. In some examples, the flow control messages may be used by the selected network switching devices to update corresponding ACL and/or FP tables in the selected network switching devices. Once all of the flow control messages are in place, the VPAN is formed and packets associated with the corresponding flow may then be forwarded within and through the autonomous system using the VPAN.

Figure 6:
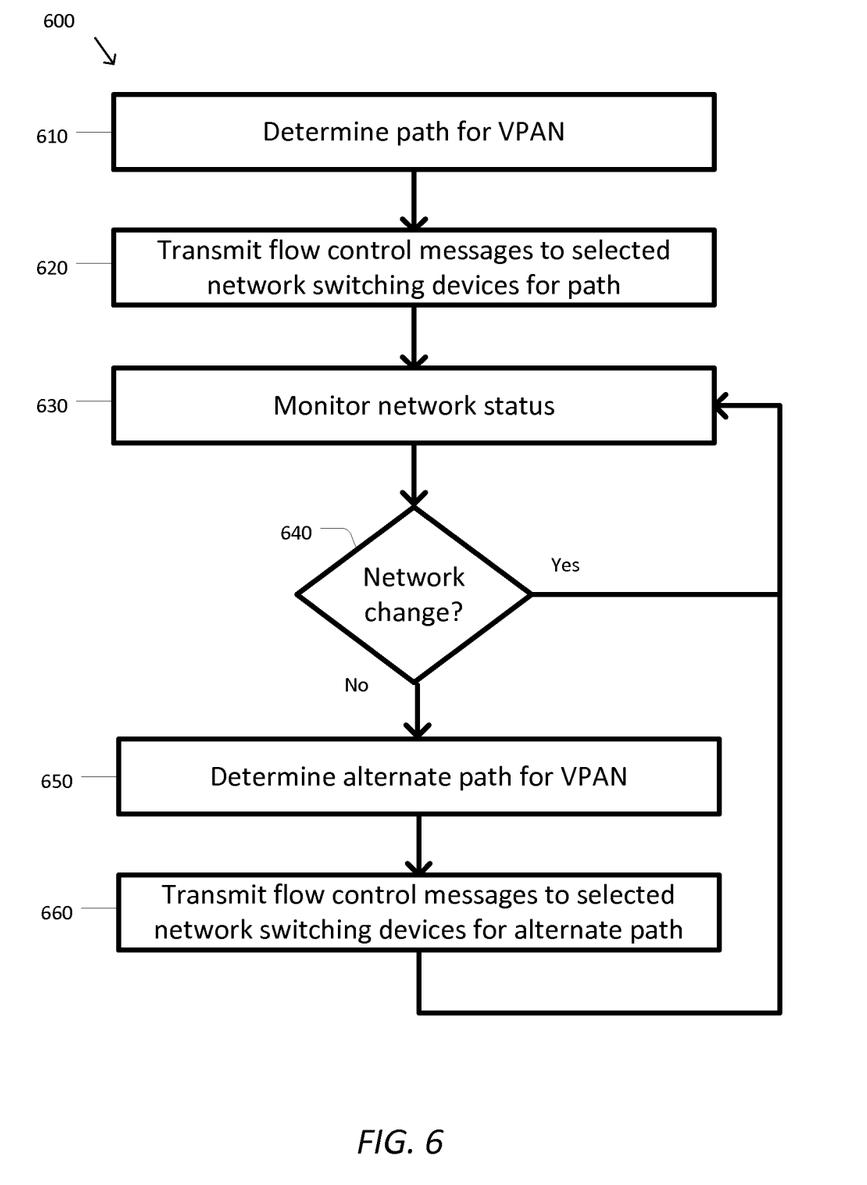
FIG. 6 is a simplified diagram showing a method of virtual private application network management according to some embodiments.

FIG. 6 is a simplified diagram showing a method 600 of VPAN management according to some embodiments. As shown in FIG. 6, the method 600 includes a process 610 for determining a path for a VPAN, a process 620 for transmitting flow control messages to selected network switching devices for the path, a process 630 for monitoring network status, a process 640 for determining whether a network change has occurred, a process 650 for determining an alternate path for the VPAN, and a process 660 for transmitting flow control messages to the selected network switching devices for the alternate path. According to certain embodiments, the method 600 of VPAN management can be performed using variations among the processes 610-660 as would be recognized by one of ordinary skill in the art. In some embodiments, one or more of the processes 610-660 of method 600 may be implemented, at least in part, in the form of executable code stored on non-transient, tangible, machine readable media that when run by one or more processors (e.g., one or more processors in the managing server 310 and/or the SDN managing server 400) may cause the one or more processors to perform one or more of the processes 610-660.

At the process 610, a path is determined for a VPAN. Once characteristics of a flow and the VPAN are determined, a managing server may select one or more network switching devices that form a path on which network traffic associated with the VPAN should be forwarded. The path may include a sequence of one or more network switching devices. In some examples, the process 610 may be included as part of the process 530.

At the process 620, flow control messages are transmitted to the selected network switching devices for the path. Once the managing server determines the path for the VPAN during the process 610, it communicates that path to each of the selected network switching devices using flow control messages. The flow control messages include instructions to each of the selected network switching devices so that they may recognize network traffic associated with the VPAN and forward that network traffic using the path. In some examples, the process 620 may be part of the process 550.

At the process 630, network status is monitored. In some examples, the managing server may actively monitor network status to determine whether the selected network switching devices are able to support the VPAN. In some examples, the managing server may actively exchange messages with the selected network switching devices and/or other network switching devices in an autonomous system to monitor status of the autonomous system. In some examples, the autonomous system may maintain TCP and/or UDP sessions with each of the selected network switching devices to exchange heartbeat and/or other status messages. In some examples, the other status messages may include congestion, utilization, and/or data and metrics related to the selected network switching devices and/or the network links between them. In some examples, the managing server may receive route withdrawal and/or route advertisement messages and the like from other network switching devices.

At the process 640, it is determined whether a network change has occurred. Based on the network status monitored during the process 630, the managing server determines whether a network change has occurred that affects the VPAN. In some examples, this may include determining that a network failure has broken the path. In some examples, this may include determining that congestion in the autonomous system suggests that an alternate path would be preferable. In some examples, this may include determining that a new path with more appropriate characteristics for the VPAN is now available. When no network change is determined or any determined change does not require a change in the VPAN, the monitoring of network status continues in process 630. When a network change is determined, an alternate path is determined using the process 650.

At the process 650, an alternate path for the VPAN is determined. When the managing server determines that changes in network status suggest and/or require a different path for the VPAN, the alternate path is determined. In some examples, the alternate path may forward VPAN network traffic around a failure and/or congestion. In some examples, the alternate path may include a new or a recently repaired network link. In some examples, determining the alternate path may include selecting different network switching devices for the alternate path.

At the process 660, flow control messages are transmitted to the selected network switching devices for the path. Once the managing server determines the alternate path for the VPAN during the process 650, it communicates that alternate path to each of the selected network switching devices using flow control messages. The flow control messages include instructions to each of the selected network switching devices so that they may recognize network traffic associated with the VPAN and forward that network traffic using the alternate path. In some examples, the process 660 may be similar to the process 620. Once the flow control messages are transmitted, the managing server returns to monitoring network status using the process 630.

Consider the following example using the autonomous system 300 of FIG. 3. Assume that network switch device 120 receives a first packet over network link 162 for a first flow. The network switch device 120 forwards a copy of the first packet to the managing server 310. When the managing server 310 receives the copy of the first packet it uses deep packet inspection to determine that the packet represents a request for a voice over IP (VoIP) session with a network device beyond the network switching device 140 (i.e., requiring the packet to be eventually forwarded to a destination using network link 164). Recognizing that VoIP sessions prefer low latency and/or reserved bandwidth, the managing server 310 decides to form a VPAN for the first flow. The managing server 310 then determines a preferred path for the VoIP session between network switching devices 120 and 140. In some examples, the preferred path may be through network switching devices 172, 173, 174, 175, and 176 to network switching device 140. In some examples, this may be done using the processes 530 and/or 610. The managing server may then transmit flow control messages to network switching devices 120, 172, 173, 174, 175, 176, and 140 including instructions to recognize packets from the first flow (e.g., by specific source and destination IP addresses and VoIP ports) and to forward them using the preferred path. In some examples, the flow control messages are transmitted using the processes 550 and/or 620. The managing server 310 may also record information regarding the VPAN for the first flow. In some examples, the information may be recorded in the SDN information 410 using the process 530.

Assume that network switching device 120 further receives a second packet over network link 162 for a second flow. The network switch device 120 forwards a copy of the second packet to the managing server 310. When the managing server 310 receives the copy of the second packet it uses deep packet inspection to determine that the packet represents a request for a hypertext transport protocol (HTTP) session with a network device beyond the network switching device 140. In some examples, the managing server 310 may decide not to create a VPAN for the second flow by recognizing that HTTP sessions do not generally require any special forwarding and/or handling. In some examples, the managing server 310 may choose to create a second VPAN with a path that avoids the preferred path of the VPAN for the first flow to help limit any congestion along the preferred path that might negatively impact the first flow. In some examples, the path for the second VPAN may be through network switching devices 179 and 176.

After further monitoring of network status (e.g., using the process 630), the managing server detects a failure in the network link between network switching devices 175 and 176. Recognizing that this is a network change (e.g., using the process 640), the managing server 310 may select an alternate path for the first flow using itself to bypass the failure. In some examples, the managing server 310 may then transmit flow control messages to network switching device 174, 175, 176 (and to itself) with the alternate path. In some examples the alternate path may be selected and communicated using the processes 650 and 660.

Some embodiments of the managing server 310 and/or the SDN managing server 400 may include non-transient, tangible, machine readable media that include executable code that when run by one or more processors may cause the one or more processors to perform the processes of methods 500 and/or 600 as described above. Some common forms of machine readable media that may include the processes of methods 500 and/or 600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of managing networks, the method comprising:
  receiving a first packet associated with a first network flow at a network device;
  determining one or more first characteristics of the first network flow based on information associated with the first packet;
  determining one or more second characteristics of a first virtual private application network (VPAN) based on information associated with the one or more first characteristics;
  assigning the first network flow to the first VPAN;
  selecting one or more first network switching devices to be associated with the first VPAN;
  determining a first path for forwarding network traffic associated with the first network flow using the selected one or more first network switching devices;
  transmitting one or more first flow control messages to the selected one or more first network switching devices, the one or more first flow control messages providing forwarding instructions for the network traffic associated with the first network flow to the selected one or more first network switching devices;
  monitoring network status;
  determining whether there has been a network change based on the monitored network status; and
  when a network change is determined:
    determining a second path for forwarding the network traffic associated with the first network flow using one or more second network switching devices; and
    transmitting one or more second flow control messages to the one or more second network switching devices, the one or more second flow control messages providing forwarding instructions for network traffic associated with the first network flow to the one or more second network switching devices.

2. The method of claim 1 wherein the network device is a managing server.

3. The method of claim 1 wherein the network device is a network switching unit.

4. The method of claim 1 wherein the network device and the selected one or more first network switching devices are associated with an autonomous system.

5. The method of claim 1 wherein determining one or more first characteristics of the first network flow comprises deep packet inspection of the first packet.

6. The method of claim 5 wherein the deep packet inspection identifies one or more encapsulated headers of the first packet that correspond to the one or more first characteristics.

7. The method of claim 1 wherein the one or more first characteristics of the first network flow are one or more selected from a group consisting of source addresses, destination addresses, TCP/UDP ports, and quality of service (QoS) designations.

8. The method of claim 1 wherein monitoring network status comprises receiving one or more heartbeat messages from the selected one or more first network switching devices.

9. The method of claim 1 wherein monitoring network status comprises receiving one or more route withdrawal messages.

10. The method of claim 1 wherein monitoring network status comprises receiving one or more route advertisement messages.

11. The method of claim 1 wherein determining one or more second characteristics of the first VPAN comprises considering one or more third characteristics of one or more second VPANs.

12. The method of claim 1, further comprising storing information associated with the one or more second characteristics in the network device.

13. The method of claim 1, further comprising:
  receiving a second packet associated with a second network flow at the network device;
  determining one or more third characteristics of the second network flow based on information associated with the second packet;
  determining one or more fourth characteristics of a second VPAN based on information associated with the one or more third characteristics;
  assigning the second network flow to the second VPAN;
  selecting one or more second network switching devices to be associated with the second VPAN; and
  transmitting one or more second flow control messages to the selected one or more second network switching devices, the one or more second flow control messages providing forwarding instructions for network traffic associated with the second network flow to the selected one or more second network switching devices.

14. The method of claim 1 wherein the one or more first flow control messages are OpenFlow messages.

15. A managing server comprising:
  a controller; and
  one or more ports coupled to the controller and configured to couple the managing server to one or more first network switching devices;
  the managing server being configured to:
  receive a packet associated with a network flow at a first port selected from the one or more ports;
  determine one or more first characteristics of the network flow based on information associated with the packet;
  determine one or more second characteristics of a virtual private application network (VPAN) based on information associated with the one or more first characteristics;
  store information associated with the VPAN;
  assign the network flow to the VPAN;
  select one or more second network switching devices from the one or more first network switching devices to be associated with the VPAN;
  transmit one or more first flow control messages to the selected one or more second network switching devices, the one or more first flow control messages providing forwarding instructions for network traffic associated with the network flow to the selected one or more second network switching devices and defining a first path using the selected one or more second network switching devices;
  monitor status associated with the one or more first network switching devices;
  determine whether there has been a network change based on the monitored status; and
  when a network change is determined:
    determine a second path for forwarding the network traffic associated with the network flow using one or more third network switching devices selected from the one or more first network switching devices; and transmit one or more second flow control messages to the selected one or more third network switching devices, the one or more second flow control messages providing forwarding instructions to the selected one or more third network switching devices for network traffic associated with the network flow.

16. An information handling system comprising:

a managing server including a controller and one or more ports coupled to the controller and configured to couple the managing server to the one or more first network switching units;

wherein the managing server is configured to:

receive a packet associated with a network flow at a first port selected from the one or more ports;

determine one or more first characteristics of the network flow based on information associated with the packet;

determine one or more second characteristics of a virtual private application network (VPAN) based on information associated with the one or more first characteristics;

store information associated with the VPAN;

assign the network flow to the VPAN;

select one or more second network switching devices from the one or more first network switching devices to be associated with the VPAN;

transmit one or more first flow control messages to the selected one or more second network switching devices, the one or more first flow control messages providing forwarding instructions for network traffic associated with the network flow to the selected one or more second network switching devices and defining a first path using the selected one or more second network switching devices;

monitor status associated with the one or more first network switching devices;

determine whether there has been a network change based on the monitored status; and when a network change is determined:

determine a second path for forwarding the network traffic associated with the network flow using one or more third network switching devices selected from the one or more first network switching devices; and transmit one or more second flow control messages to the selected one or more third network switching devices, the one or more second flow control messages providing forwarding instructions to the selected one or more third network switching devices for network traffic associated with the network flow.

\* \* \* \* \*